Figure 1:
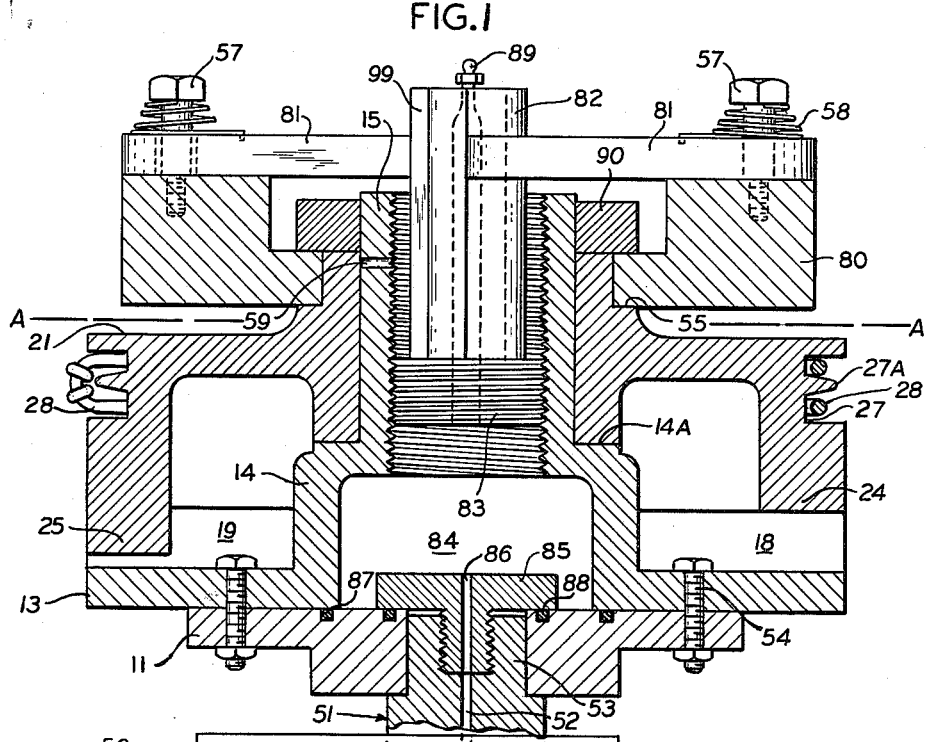

Sept. 4, 1962 W. D. CARDWELL 3,052,255
PLUG VALVE OPERATOR AND AUTOMATIC LUBRICATOR
Filed April 19, 1960 2 Sheets-Sheet 1

INVENTOR
WILLIAM D. CARDWELL
BY
James M. Heilman
ATTORNEY

Sept. 4, 1962 W. D. CARDWELL 3,052,255
PLUG VALVE OPERATOR AND AUTOMATIC LUBRICATOR
Filed April 19, 1960 2 Sheets-Sheet 2

INVENTOR
WILLIAM D. CARDWELL

BY *James M. Heitman*
ATTORNEY

United States Patent Office 3,052,255
Patented Sept. 4, 1962

3,052,255
PLUG VALVE OPERATOR AND AUTOMATIC LUBRICATOR
William D. Cardwell, 1912 W. 40th St., Tulsa, Okla.
Filed Apr. 19, 1960, Ser. No. 23,204
8 Claims. (Cl. 137—246.13)

The present invention broadly relates to an operating valve assembly whereby an impact force may be applied to open or close a valve. The invention especially relates to a valve operating assembly adapted to permit accommodation to existing plug valve structures without modifications thereof. The present invention specifically relates to an improvement on the invention described in U.S. Patent No. 2,951,394 issued September 6, 1960, entitled, "Valve Operating Assembly," inventor William D. Cardwell.

In manufacturing and fluid transport operations, great numbers of valves are employed for controlling flow of liquids and the like. A large portion of the valves employed are subjected to conditions which make them difficult to operate and infrequent use may cause a valve to freeze or stick. Where such a condition occurs, hazardous conditions result. Also, a conduit rupture might produce excessive losses of materials, should it be impossible to close a shut-off valve quickly. Again, large valves in conduits under high pressure are difficult to open and close. Many times, two or more men are required to operate a valve.

It is an object of the present invention to provide a self-lubricating plug valve operating assembly which will permit operation of the plug valve under the most adverse conditions of use, and which may be applied to a conventional plug valve stem either as a replacement for the valve wheel supplied as standard equipment, or as an adjunct thereto.

Specifically, the present invention is concerned with an automatic lubricator which is adapted to be mounted directly on the plug valve in conjunction with the assembly described in said above-identified patent so that each time before the valve is operated, a predetermined quantity of valve grease is applied to the internal parts of the valve, by actuating the grease plunger with the free motion of the impactor.

The apparatus described in said aforenoted patent, in essence, comprises a mounting plate adapted to be rigidly affixed to the stem of the plug. The stem is adapted to rotate the plug in the valve so as to open and close the valve in a manner known in the plug valve art. The mounting plate may be keyed to the stem, held by set screw means or otherwise rigidly secured. The mounting plate is preferably provided with a center chuck hole adapted to fit the shank end of the valve stem to which it is to be applied instead of the spanner or box wrench ordinarily utilized to actuate the valve stem.

An anvil plate element is rigidly affixed to the mounting plate by any suitable means. The anvil plate includes a hollow, integral hub and axle portions. The hub and axle together provide and define a central passageway, having an enlarged end adjacent the inner or reverse surface of the plate. An external shoulder is formed at the juncture of the hub and axle portions. Wing portions extend radially from the hub. In the plate obverse surface portions are defined a pair of embossed anvil lugs also extending radially outward from the hub. The lugs have each a substantially V-shaped contour based on the hub whereby to present flat anvil surfaces lying in planes common to the axis of the hub and perpendicular to the anvil plate surface. The V-shaped lugs also act as plate stiffening ribs. Further, these planes intersect at the anvil plate axis, whereby from lug to lug alternate surfaces lie in the same plane.

A striker plate element preferably in circular form, having a central hub, an annular rim, and obverse and reverse surface portions, is positioned above the anvil plate. The hub of the striker plate is adapted to receive the axle of the anvil plate for rotative movement thereon, with the anvil plate shoulder in surface contact with the reverse surface of the striker plate at the hub thereof. The length of the axis of the anvil plate is so determined so as to provide for extension thereof beyond the striker plate obverse surface for a distance required to accommodate the automatic grease assembly of the present invention.

The rim of the striker plate extends outwardly beyond the reverse surface portion and in perpendicular relation thereto. This extended portion extends for a distance slightly less than a vertical distance between the outer surface of the shoulder and the upper surface of the lugs. This rim provides a base for a pair of striker lugs which are disposed in opposed relation diametrically of the plate. These lugs have a depth slightly less than the height of the anvil lugs. Each of the lugs presents two opposite face portions at right angles to the parallel rim and reverse plate surfaces.

Each such lug surface lies in a plane extending through the axis of the plate and at right angles to the surfaces thereof. Furthermore, these planes intersect at the plate axis, whereby from lug to lug alternate surfaces lie in the same plane. In addition, the angle of intersection of these planes is equal to the angle of intersection of the planes common to the anvil surfaces of the respective V-shaped anvil lugs whereby the surfaces of the striker lugs may be engaged with the anvil lug surfaces in substantially total surface contact. In mounting the plate on the axis, the striker lugs are disposed so as to be intermediate the anvil lugs.

In addition, the rim defines a recess channel portion circumferentially of the rim and plate, intermediate the obverse and reverse portions thereof. The channel has a bottom wall on which are formed a plurality of upstanding radial studs. These studs extend outwardly from the bottom wall, and are uniformly spaced from one another peripherally thereof. It is contemplated that the channel and studs will be integrally formed in the striker plate rim, in a casting operation. Alternately, however, the studs may be omitted in the casting operation, and be provided by insertion of separately formed stud pins threaded or forced into receiving recesses drilled in the bottom wall.

In effect, the channel and studs cooperate to provide a recessed sprocket structure, adapted to receive an endless sprocket chain. By means of the chain, the plate may be rotated in either a clockwise or counterclockwise direction, whereby to engage the striker and anvil lugs.

Figure 2:
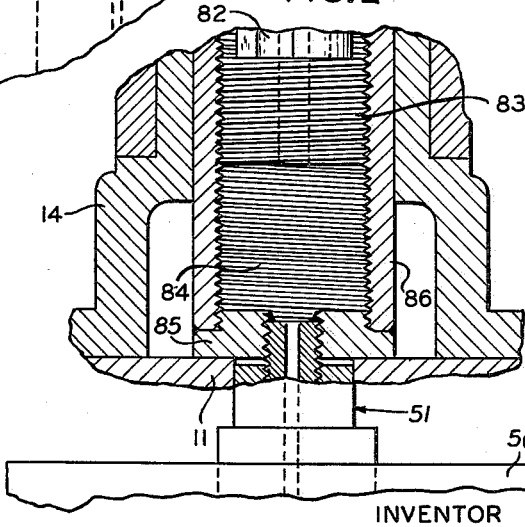
Figure 3:
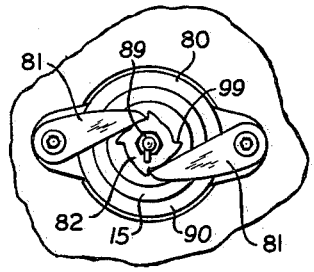
Figure 4:
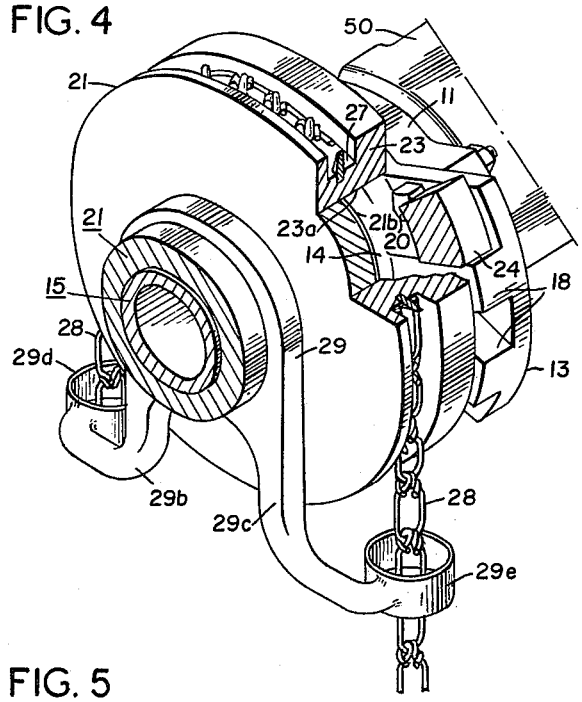
Figure 5:
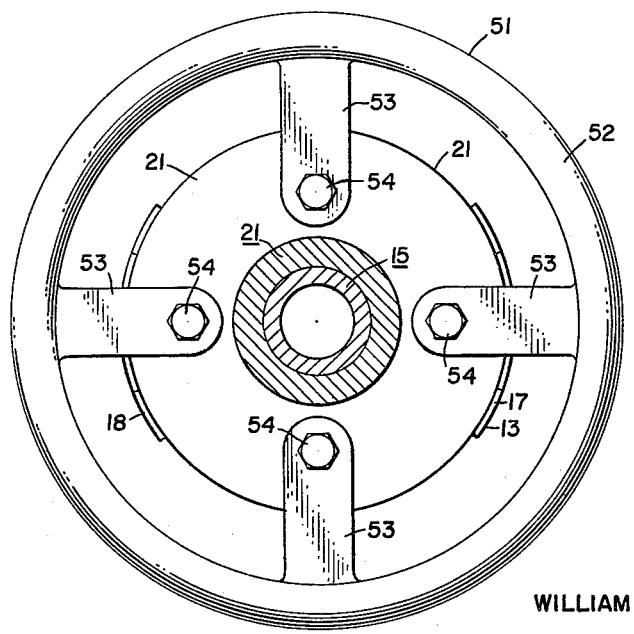

The present invention may be fully understood by reference to the drawings illustrating one embodiment of the same. FIGURE 1 is a cross-sectional vertical view showing the assembly attached to a conventional plug valve. FIGURE 2 illustrates in some detail the nipple arrangement of a slightly different construction for high heat exposure wherein O ring seals are replaced by a metal cylinder. This figure shows the attachment of the screw existing grease fitting hole of a plug valve, while FIGURE 3 is a top plan view showing in some detail the grease plunger and the ratchet mechanism. FIG. 4 is a perspective view of the assembly taken on the line A—A of FIG. 1 and showing the chain operating device but with the automatic lubricating ratchet removed and having parts broken away. FIG. 5 is a modified form of extended handle operating device identical to that in my prior Patent No. 2,951,394, the view also being taken on the line A—A of FIG. 1.

Referring specifically to FIGURE 1, 50 designates a conventional plug valve having a valve stem 51 protruding therefrom, comprising a shank element 53. The shank 53 and the stem 51 have an annular port 52 therethrough which represents the existing and conventional ports for supplying grease to the inner areas of the valve. These elements comprise known elements of existing plug type valves.

In accordance with the present invention, a mounting plate 11 is attached to shank 53 of the valve stem. Mounting plate 11 has a center, open hub section which seats securely over the shank in a manner as the conventional spanner wrench seats over the shank. An anvil plate 13 is securely attached or affixed to mounting plate 11 by suitable means, such as by pins 54. This anvil plate has an obverse and reverse surface. Anvil lugs 18 and 19 are embossed on the obverse surface of the anvil plate. The anvil plate comprises hub section 14 and an axle section 15, forming a shoulder 14a. A striker plate 21 similar to that described heretofore is mounted about the axle section 15 and is rotative thereto. The striker has an outwardly annular rim and a channel circumferentially therearound having a bottom wall 27 and stud elements 27a. Striker lugs 24 and 25 are so positioned in a manner as described heretofore so as to secure impact between the striker lugs and the anvil lugs. As described in the above-identified patent, the rim and studs may be replaced by a hand wheel for actuating the striker plate.

In accordance with the specific adaptation of the present invention, the upper area of the striker plate positioned about the axle of the anvil plate comprises a shoulder 55 which is adapted to support a ratchet body 80. This ratchet body is circumferentially mounted on the shoulder. The axis 15 of the anvil plate 13 is internally threaded so as to receive the screw type plunger 83. The screw plunger 83 has an upwardly extending channeled or ear type arm or stem 82 which, when rotated clockwise, will cause the screw type plunger to advance downwardly within the axis 15, thereby exerting pressure on the grease with the reservoir. The grease will be forced through port 86 in nipple 85 which communicates with port 52 in shank 53. Nipple 85 is in threaded engagement with shank 53.

Flow of grease other than into port 82 is prevented by O type seal rings 87 and 88.

The stem 82 is of the ratchet type which will permit the ratchet fingers 81 to engage the notched portions 99 therein and cause the stem to rotate, thereby causing plunger 83 to be lowered within axle 15. Tension of the ratchet fingers 81 so as to seat them in notches 99 is maintained by spring 58 and plug 57. The reservoir 84 containing the desired grease comprises the area within the hub and axis of the anvil plate. This area may be filled through a loading port or grease fitting 89. A vent 59 is provided to expel the locked-in air while filling with grease.

The ratchet body 80 is rigidly affixed by suitable means such as ring 90, to the striker plate. Thus, as the striker plate is moved forward and backward, the ratchet fingers 81 in a conventional manner slide over the recesses or ears 99 in ratchet 82 and engage in the recesses. As the striker plate 21 is moved clockwise, the ratchet fingers engage in the recesses of arm 82, cause the arm to rotate, thereby rotating the plunger 83 within the axis of the plate 13, causing the plunger to move downwardly, thereby causing the grease within the reservoir to flow through 86 through nipple 85 into the conventional lubricating channels 52 of plug valve 50.

FIGURE 2 is a cross-sectional vertical view showing a somewhat changed reservoir construction. An internally threaded metal cylinder 86 is positioned within the hub and axle of the anvil plate. The internal area of this cylinder comprises the reservoir 84, and plunger 83 moves downwardly therein. The upper area of the nipple 85 is adapted to be threaded into the lower end of the cylinder, thereby providing against grease leakage and thus replacing the O type seal rings. This is desirable in locations where high heat exposure exists.

FIG. 4 is an enlarged, detailed view of FIG. 1 with the automatic lubricating ratchet removed. Attached to plug valve 50 is a striker plate 21 having an upstanding central hub surrounding the axle 15. Surrounding the hub is a chain guide 29 retained thereon by any suitable means and having a pair of arms 29b and 29c and terminating in annular eyes 29d and 29e. The operating chain 28 passes through the eyes 29d and 29e.

FIG. 5 illustrates an extended handwheel 51 having a rim 52 and a plurality of radial spoke elements 53 secured by stud bolts 54 to striker plate 21. Element 17 illustrates a wing portion extending beyond the outer tips of the V-shaped lug 18. Obviously, an appreciable mechanical advantage is obtained by the extended handwheel.

In essence, the present invention comprises a novel method and apparatus for automatically supplying lubrication to a plug valve when using a particular type of valve operating assembly. The amount of grease supplied is a direct function of the extent to which the valve is actuated, which is very desirable. While the exact construction may vary appreciably, the automatic lubricator is so constructed that the ratchet operated plunger rotates approximately 120°. On the average, this may allow the valve to be opened or closed approximately 100 times, using a 16 pitch on the plunger, before the grease supply is exhausted and refilling is required. This represents a real advantage since in the past it has not been practical to operate plug valves by means of a chain, since it has been necessary that these valves be positioned in a location where the operator could easily and readily get to them in order to service these valves.

What is claimed is:

1. A self-lubricating valve operating assembly comprising in combination, an anvil plate having obverse and reverse surface portions, a hollow axle on said obverse surface portion extending outwardly therefrom in perpendicular relation thereto, said hollow being adapted to retain grease, a pair of anvil studs embossed on said obverse surface portion and disposed thereon in opposed relation diametrically of said anvil plate axle, a striker plate unit, having obverse and reverse surface portions, a pair of striker studs embossed on said striker plate reverse surface portion and disposed thereon in opposed relation diametrically of said striker plate, a hub defined in said striker plate opening through said plate obverse and reverse surface portions, said hub adapted to receive said anvil plate axle for rotation thereon whereby to engage said striker studs with said anvil studs in either a clockwise or a counterclockwise direction, means for rotating said striker plate, means for mounting said assembly in operative relation with the valve stem of a plug valve in a manner that the hollow area of said axle communicates with a grease port of said plug valve, means to retain said striker plate against movement longitudinally of said anvil plate axle, a plunger means adapted to move downwardly within said hollow area, means mounted on said striker plate for rotation therewith to move said plunger means downwardly during movement of said means in one direction only, whereby the grease within said hollow area flows into the grease port of said plug valve.

2. Apparatus as defined by claim 1 wherein said anvil plate is mounted to the stem of said plug valve by means of a hollow mounting plate adapted to seat on the shank of said stem and wherein communication between said hollow area and said grease port of said plug valve is through a nipple element in threaded communication with said shank.

3. Apparatus as defined by claim 2 wherein an internally threaded cylinder is positioned within said hollow axis through which said plunger moves downwardly, said cylinder being in threaded communication with the upper area of said nipple.

4. A valve operating assembly according to claim 1 wherein said means for rotating said striker plate comprises a hand wheel having a rim and a series of spoke elements extending radially inward from said rim in opposed pairs, said spokes terminating in equally spaced relation to the center point of said rim, and each being adapted for fixed engagement with the obverse surface of said striker plate.

5. A valve operating assembly according to claim 1, wherein said means for rotating said striker plate comprises a rim portion on said striker plate, a circumferential channel defined in said rim to open radially therefrom, said channel having a bottom wall, a series of studs, extended radially outward from the bottom wall of said channel, in uniform circumferentially spaced relation one to another, said channel and studs being respectively adapted to receive and to engage the links of a bight of an endless link chain laid therein, and a chain guide freely supported from said anvil plate axle to receive the respective dependent portions of said chain bight, and to align said portions with said channel.

6. A valve operating assembly comprising in combination, an anvil plate, an axle on said anvil plate extending outwardly therefrom, a pair of anvil studs on said anvil plate, a striker plate unit, a pair of striker studs on said striker plate, a hub defined in said striker plate opening, said hub adapted to receive said anvil plate axle for rotation thereon whereby to engage said striker studs with said anvil studs in either a clockwise or a counter-clockwise direction, means for rotating said striker plate, means for mounting said assembly in operative relation with the valve stem of a valve, ratchet means mounted on said striker plate unit for rotation therewith, a reservoir for grease formed in said axle, and a plunger including a ratch stem operatively associated with said ratchet means and said reservoir whereby when said valve is operated, grease from said reservoir will be forced into said valve.

7. A valve operating assembly comprising in combination, an anvil plate having obverse and reverse surface portions, a hollow axle on said obverse surface portion extending outwardly therefrom in perpendicular relation thereto, a pair of anvil studs embossed on said obverse surface portion and disposed thereon in opposed relation diametrically of said anvil plate axle, a striker plate unit, having obverse and reverse surface portions, a pair of striker studs embossed on said striker plate reverse surface portion and disposed thereon in opposed relation diametrically of said striker plate, a hub defined in said striker plate opening through said plate obverse and reverse surface portions, said hub adapted to receive said anvil plate axle for rotation thereon whereby to engage said striker studs with said anvil studs in either a clockwise or a counter-clockwise direction, means for rotating said striker plate, means for mounting said assembly in operative relation with the valve stem of a valve, means to retain said striker plate against movement longitudinally of said anvil plate axle, said axle being screw threaded on its inner surface, ratchet means mounted on said striker plate unit for rotation therewith, a reservoir for a lubricant, and a screw threaded plunger positioned within said axle including a ratch stem and operatively associated with said axle, ratchet means and reservoir, whereby when said valve is operated, lubricant from said reservoir will be forced by said plunger into the moving elements of said valve.

8. A self-lubricating valve operating assembly comprising in combination, an anvil plate having obverse and reverse surface portions, a hollow axle on said obverse surface portion extending outwardly therefrom in perpendicular relation thereto, said hollow axle area being adapted to retain grease, a pair of anvil studs embossed on said obverse surface portion and disposed thereon in opposed relation diametrically of said anvil plate axle, a striker plate unit, having obverse and reverse surface portions, a pair of striker studs embossed on said striker plate reverse surface portion and disposed thereon in opposed relation diametrically of said striker plate, a hub defined in said striker plate opening through said plate obverse and reverse surface portions, said hub adapted to receive said anvil plate axle for rotation thereon whereby to engage said striker studs with said anvil studs in either a clockwise or a counterclockwise direction, means for rotating said striker plate, means for mounting said assembly in operative relation with the valve stem of a plug valve in a manner that the hollow area of said axle communicates with a grease port of said plug valve, means to retain said striker plate against movement longitudinally of said anvil plate axle, a plunger adapted to move downwardly within said hollow area as said assembly is actuated, whereby the grease within said hollow area flows into the grease port of said plug valve, and ratchet means mounted on said striker plate for rotation therewith and wherein said plunger is of the screw type including a ratch stem which is activated by said ratchet means.

References Cited in the file of this patent
UNITED STATES PATENTS

| | | |
|---|---|---|
| 1,685,359 | Herb | Sept. 25, 1928 |
| 1,807,340 | Martin | May 26, 1931 |
| 2,057,343 | Pierce | Oct. 13, 1936 |
| 2,323,421 | Reed | July 6, 1943 |
| 2,951,394 | Cardwell | Sept. 6, 1960 |